(12) United States Patent
Jung et al.

(10) Patent No.: US 10,531,503 B2
(45) Date of Patent: Jan. 7, 2020

(54) DEVICE-TO-DEVICE (D2D) OPERATION METHOD OF USER EQUIPMENT IN WIRELESS COMMUNICATION SYSTEM AND USER EQUIPMENT USING THE METHOD

(71) Applicant: LG Electronics Inc., Seoul (KR)

(72) Inventors: Sunghoon Jung, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 15/516,972

(22) PCT Filed: Oct. 14, 2015

(86) PCT No.: PCT/KR2015/010857
§ 371 (c)(1),
(2) Date: Jul. 31, 2017

(87) PCT Pub. No.: WO2016/060481
PCT Pub. Date: Apr. 21, 2016

(65) Prior Publication Data
US 2018/0167988 A1    Jun. 14, 2018

Related U.S. Application Data

(60) Provisional application No. 62/063,407, filed on Oct. 14, 2014, provisional application No. 62/076,775,
(Continued)

(51) Int. Cl.
*H04W 76/14*    (2018.01)
*H04W 48/16*    (2009.01)
(Continued)

(52) U.S. Cl.
CPC ........... *H04W 76/14* (2018.02); *H04W 8/005* (2013.01); *H04W 8/24* (2013.01); *H04W 48/02* (2013.01);
(Continued)

(58) Field of Classification Search
None
See application file for complete search history.

(56) References Cited

U.S. PATENT DOCUMENTS

2006/0036518 A1   2/2006  O'Neill
2014/0328329 A1*  11/2014  Novlan ............... H04W 72/042
                                                     370/336
(Continued)

FOREIGN PATENT DOCUMENTS

CN    103533533 A    1/2014
WO    2013177179 A1  11/2013
WO    2014/161486 A1 10/2014

OTHER PUBLICATIONS

Huawei et al., "D2D impacts on scheduling request and Text Proposals" 3GPP TSG-RAN WG2 Meeting #87 bis, Shanghai, China, Sep. 27, 2014—R2-144404.
(Continued)

*Primary Examiner* — Saba Tsegaye
(74) *Attorney, Agent, or Firm* — Dentons US LLP

(57) ABSTRACT

Provided are a device-to-device (D2D) operation method of a user equipment (UE) in a wireless communication system and a UE using the method. The method comprises the steps of: transmitting sidelink UE information to a network; and receiving a D2D resource configuration determined on the basis of the sidelink UE information, wherein the sidelink UE information comprises at least one of information indi-
(Continued)

cating whether the UE is interested in receiving a D2D signal, and a resource allocation request for transmitting the D2D signal.

7 Claims, 19 Drawing Sheets

Related U.S. Application Data filed on Nov. 7, 2014, provisional application No. 62/219,146, filed on Sep. 16, 2015.

(51) Int. Cl.
| | | |
|---|---|---|
| *H04W 8/24* | (2009.01) | |
| *H04W 76/27* | (2018.01) | |
| *H04W 8/00* | (2009.01) | |
| *H04W 48/02* | (2009.01) | |
| *H04W 72/04* | (2009.01) | |
| *H04W 88/04* | (2009.01) | |
| *H04W 92/18* | (2009.01) | |
| *H04W 4/70* | (2018.01) | |
| *H04W 24/10* | (2009.01) | |

(52) U.S. Cl.
CPC ......... *H04W 48/16* (2013.01); *H04W 72/042* (2013.01); *H04W 76/27* (2018.02); *H04W 88/04* (2013.01); *H04W 4/70* (2018.02); *H04W 24/10* (2013.01); *H04W 92/18* (2013.01)

(56) References Cited

U.S. PATENT DOCUMENTS

2016/0157172 A1* 6/2016 Jeong .................... H04W 76/14
370/329
2017/0171837 A1* 6/2017 Chen ..................... H04W 72/04

OTHER PUBLICATIONS

Fujitsu, "Considerations on Resource Allocation for ProSe Discovery" 3GPP TSG-RAN WG2 Meeting #87 bis, Shanghai, China, Sep. 26, 2014—R2-144289.
Ericsson et al., "WF on Pools Configuration," 3GPP TSG-RAN WG1 Meeting #78, Dresden, Germany, Aug. 27, 2014—R1-143455.
Ericsson, "Resource allocation for ProSe Direct Discovery," 3GPP TSG-RAN WG2 #86, May 19-23, 2014, R2-142407.
Qualcomm Incorporated, "Signaling Details for ProSe Direct Discovery," 3GPP TSG-RAN WG2 #86, May 19-23, 2014, R2-142540.
Zte: "ProSe prioritization and interest indication", R2-144462, 3GPP TSG RAN WG2 Meeting #87bis, Shanghai, P.R. China, Oct. 6-10, 2014.

* cited by examiner

DEVICE-TO-DEVICE (D2D) OPERATION METHOD OF USER EQUIPMENT IN WIRELESS COMMUNICATION SYSTEM AND USER EQUIPMENT USING THE METHOD

CROSS-REFERENCE TO RELATED APPLICATIONS

This application is the National Stage filing under 35 U.S.C. 371 of International Application No. PCT/KR2015/010857, filed on Oct. 14, 2015, which claims the benefit of U.S. Provisional Applications No. 62/063,407 filed on Oct. 14, 2014, No. 62/076,775 filed on Nov. 7, 2014, and No. 62/219,146 filed on Sep. 16, 2015, the contents of which are all hereby incorporated by reference herein in their entirety.

BACKGROUND OF THE INVENTION

Field of the Invention

The present invention relates to a wireless communication system, more particularly a method of D2D operation performed by a UE in the wireless communication system and the UE using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed.

If D2D UE plays the role of a relay, it may also play the role of extending coverage of a base station.

Meanwhile, the network may configure a resource pool that may perform the D2D operation to the UE. For example, the network may inform the UE of the resource pool that may receive the D2D discovery signal through system information. The UE may monitor the D2D discovery signal in the resource pool that may receive the D2D discovery signal. However, for example, the UE may be a UE having only one receiving unit and a resource (frequency) for capable of receiving a downlink signal of a general cellular communication may be different from a resource (frequency) capable of receiving the D2D discovery signal. In this case, while the UE is monitoring/receiving the D2D discovery signal, it may not receive a downlink signal of general cellular communication.

If the UE is for receiving the D2D discovery signal, it may only be interested in some resources of the resource pool that may receive the D2D discovery signal. In this case, it is inefficient to not receive the downlink signal of the cellular communication in the entire resource pool by monitoring the D2D discovery signal in the entire resource pool.

SUMMARY OF THE INVENTION

Technical aspect which is to be solved in the present invention is to provide a method of D2D operation performed by a UE in a wireless communication system and the UE using the method.

In one aspect, provided is a method of device-to-device (D2D) operation of a user equipment (UE) in a wireless communication system. The method includes transmitting sidelink UE information to a network and receiving a D2D resource configuration based on the sidelink UE information. The sidelink UE information includes at least one of information whether the UE is interested in receiving a D2D signal and a resource allocation request for a transmission of the D2D signal.

The method may further include receiving system information indicating a resource pool capable of performing the D2D operation from the network.

The system information may inform the resource pool in which the UE is capable of receiving a discovery signal.

The UE may inform the network of the resource with which the UE is interested in receiving the D2D signal through the sidelink UE information.

The resource with which the UE is interested in receiving the D2D signal is a subset of resource pool capable of performing the D2D operation indicated by system information received from the network.

The D2D resource configuration may include gap information.

The gap information may be information indicating a time interval during which the UE does not need to monitor a downlink signal transmitted from the network.

The UE may monitor the discovery signal in a time interval during which the UE does not need to monitor the downlink signal transmitted by the network The gap information may be indicated as a bitmap for subframes which are capable of receiving the D2D signal.

In another aspect, provided is a user equipment (UE). The UE includes a Radio Frequency (RF) unit and a processor operatively coupled to the RF unit. The processor is further configured to: transmit sidelink UE information to a network and receive a D2D resource configuration based on the sidelink UE information. The sidelink UE information includes at least one of information whether the UE is interested in receiving a D2D signal and a resource allocation request for a transmission of the D2D signal.

According to the present invention, by informing the network of a resource in which the UE is interested for the D2D operation, the network may guarantee the reliability of the D2D operation even if only a limited resource is allocated to the UE.

DESCRIPTION OF EXEMPLARY EMBODIMENTS

Figure 1:
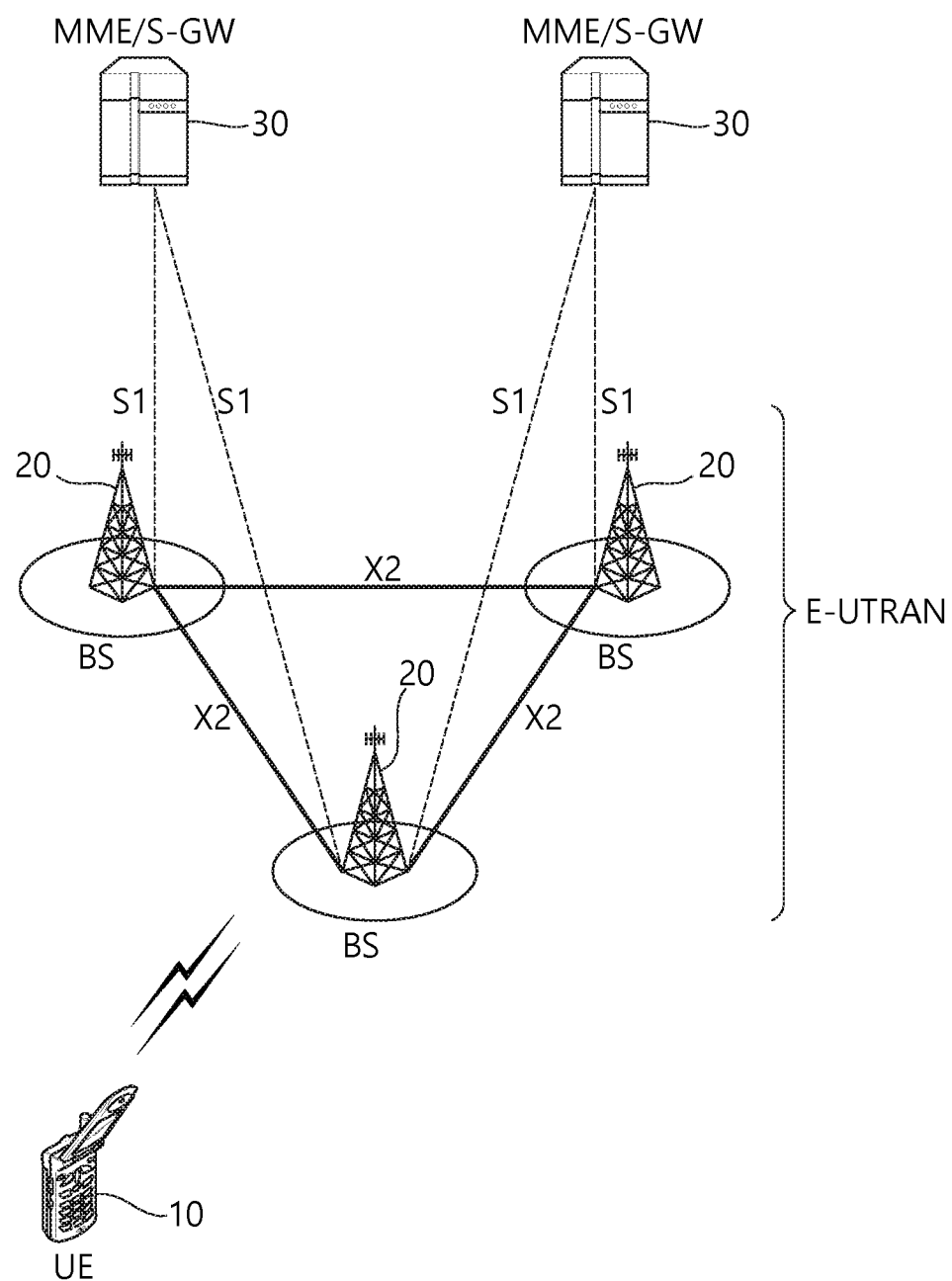
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
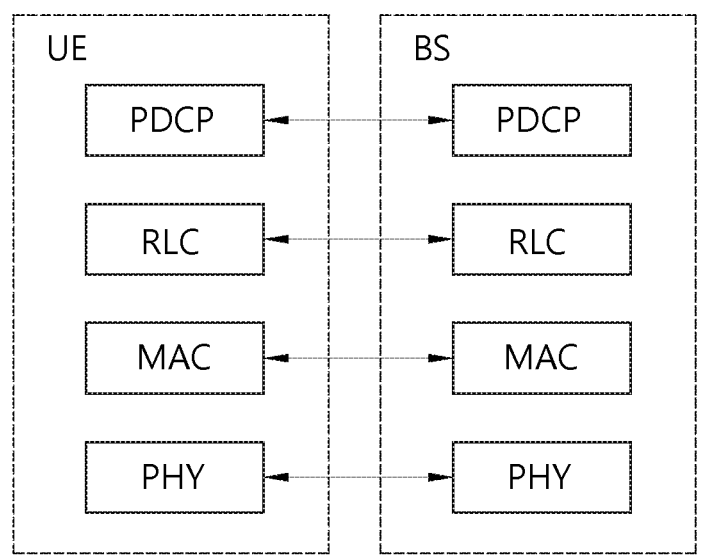
FIG. 2 is a diagram showing a wireless protocol architecture for a user plane.
Figure 3:
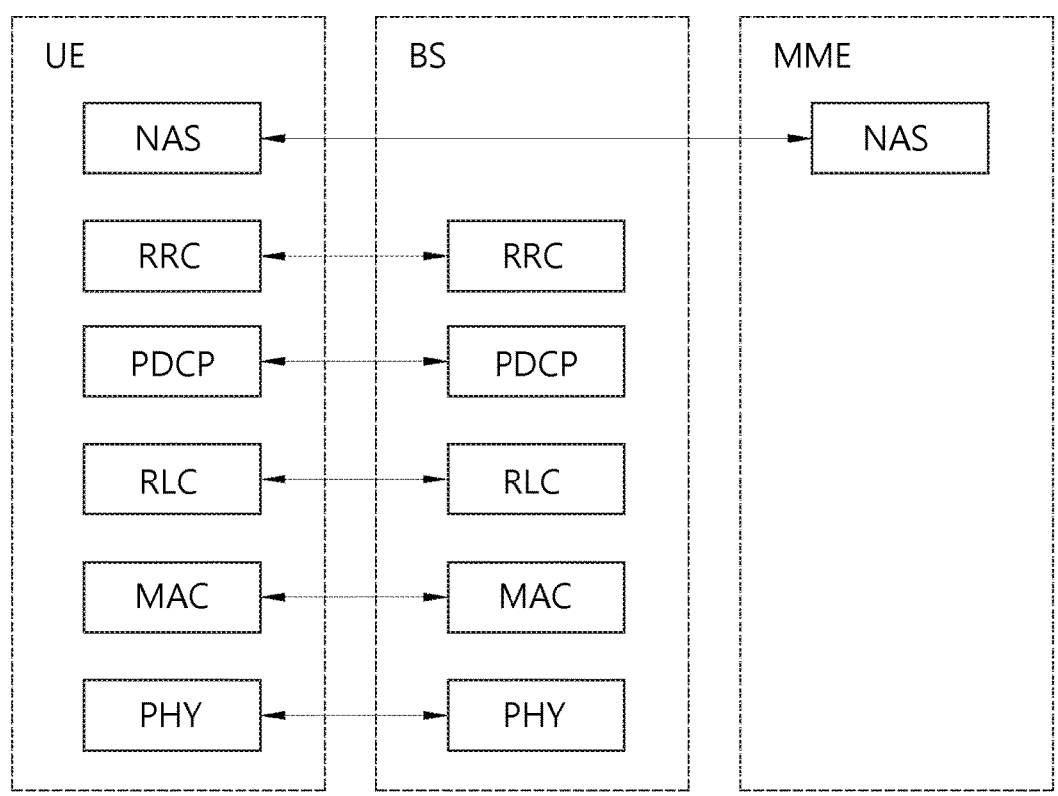
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
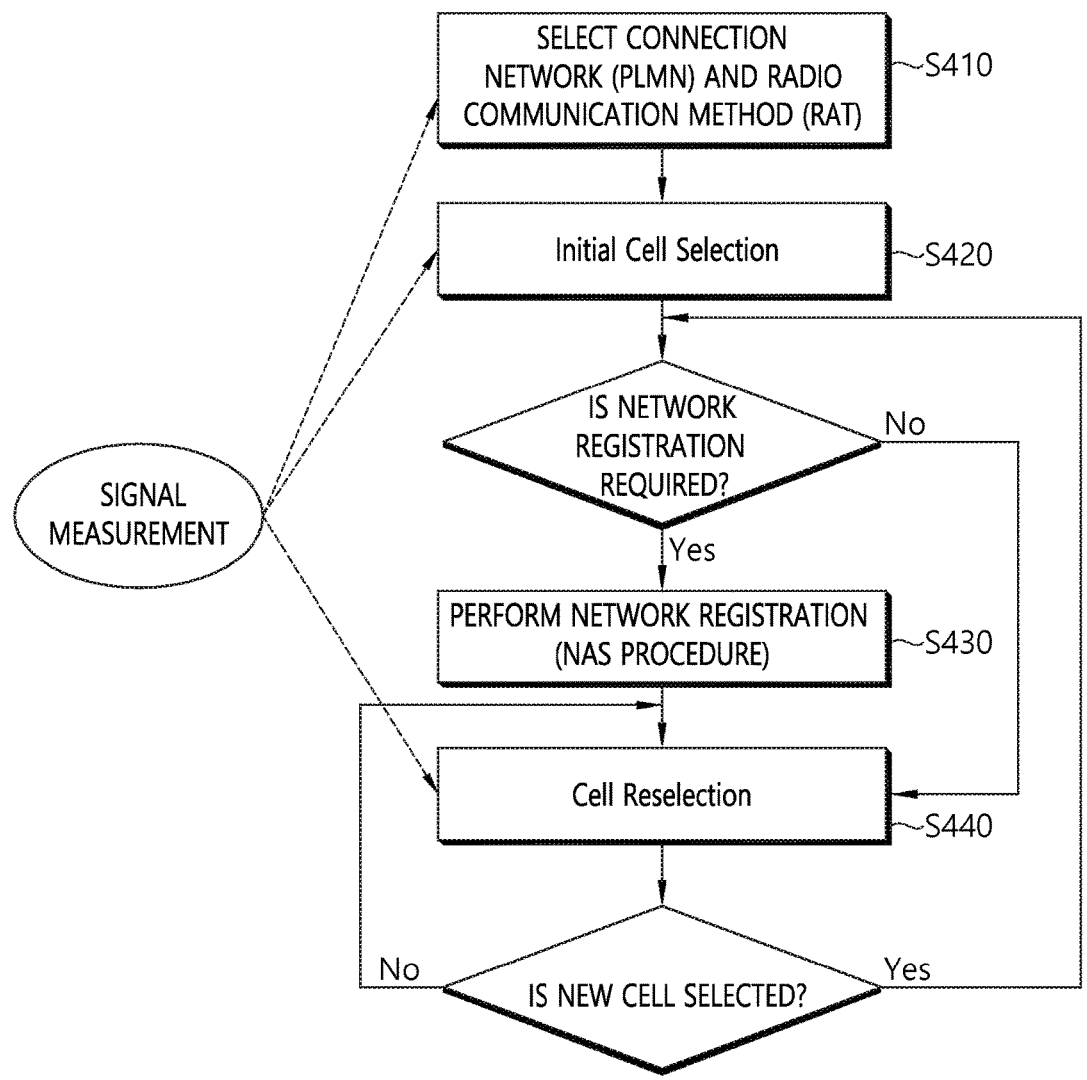
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
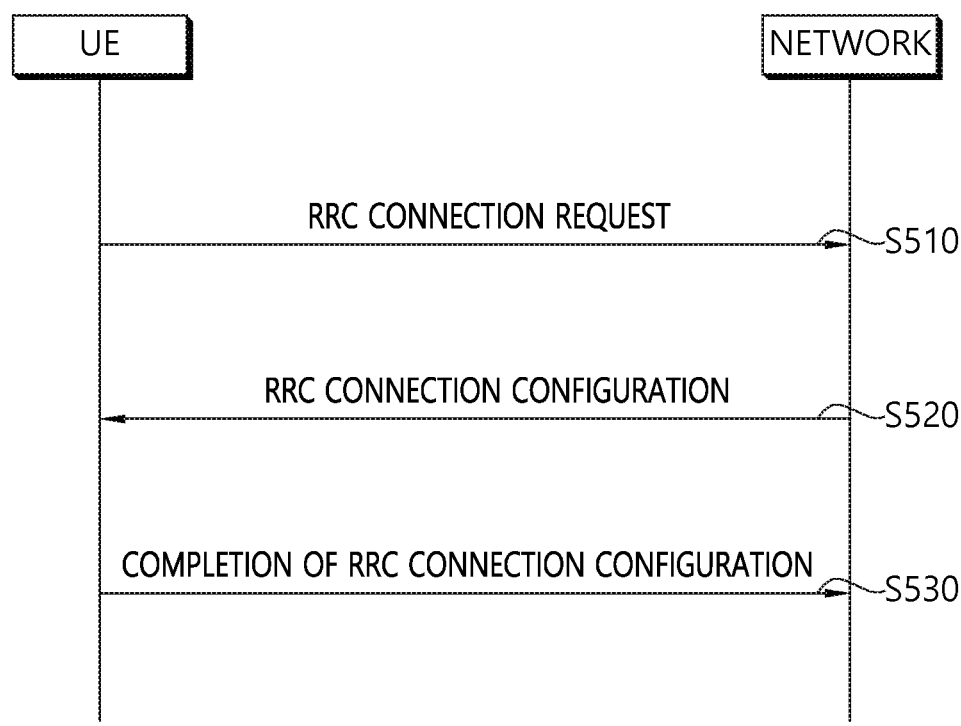
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
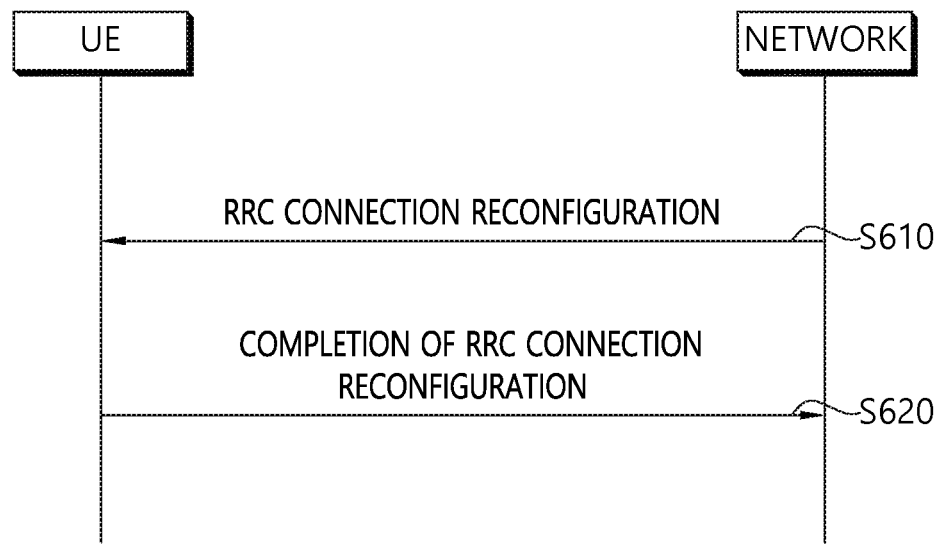
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset}) \quad \text{[Equation 1]}$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Qmeas,s + Qhyst, Rn = Qmeas,s - Qoffset \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not receive Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 7:
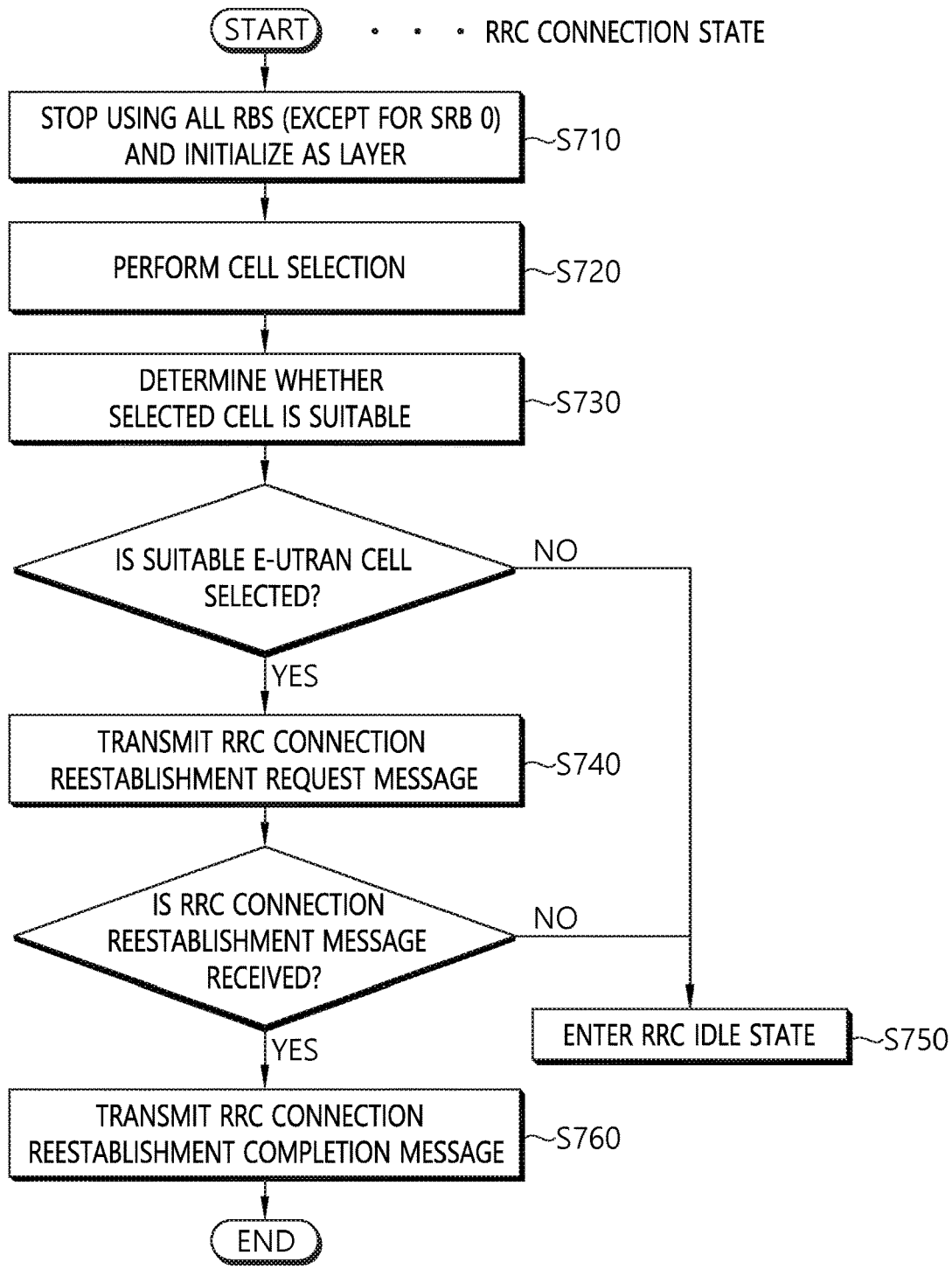
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
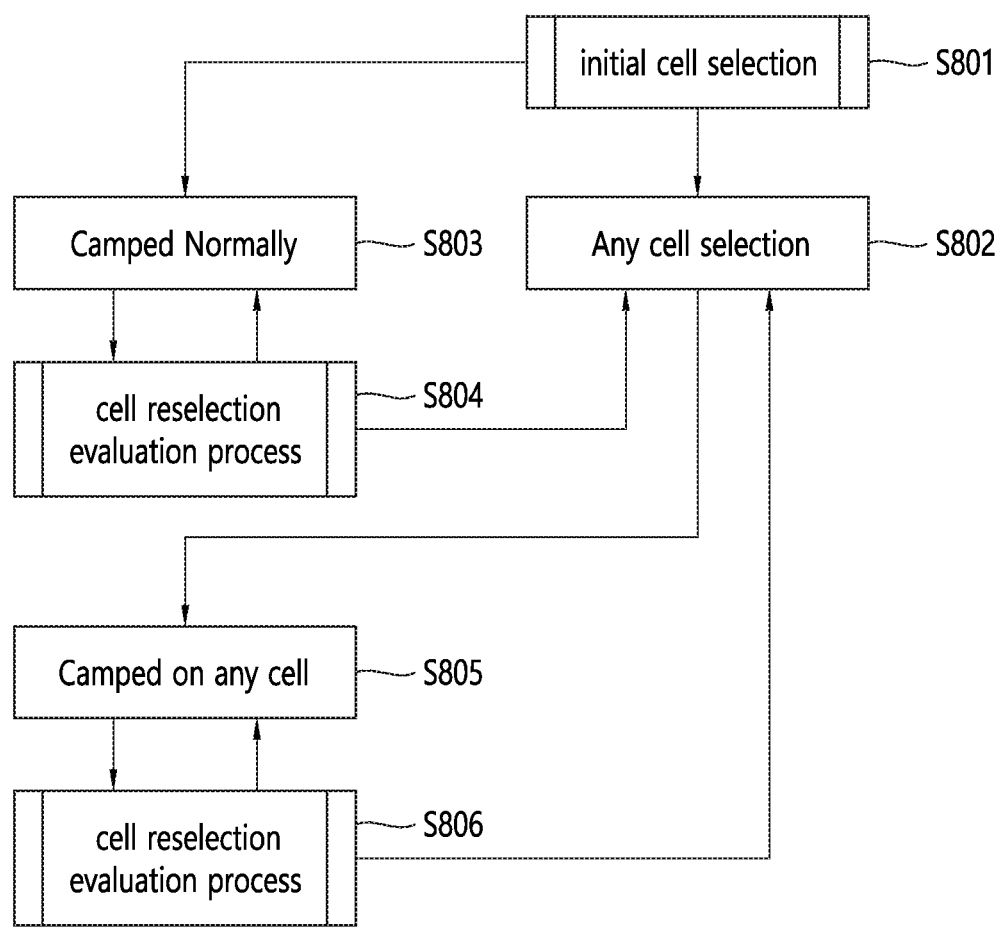
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
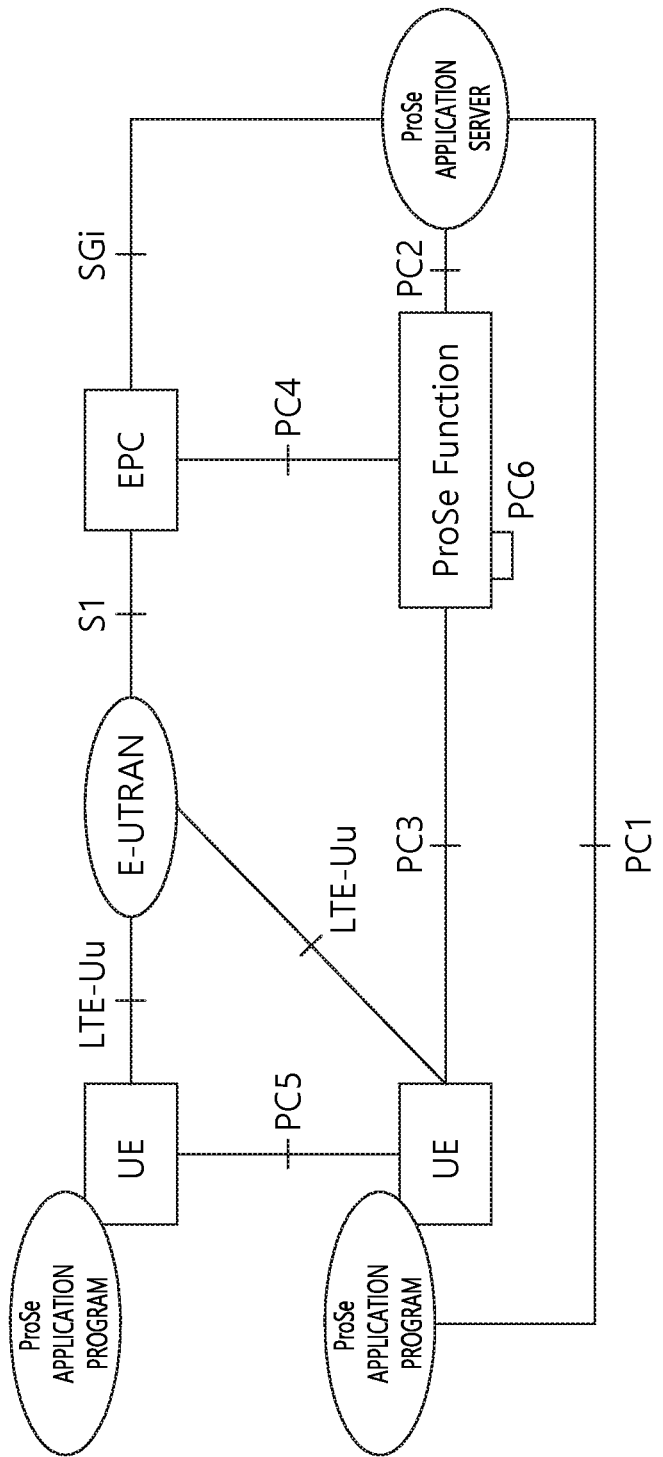
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
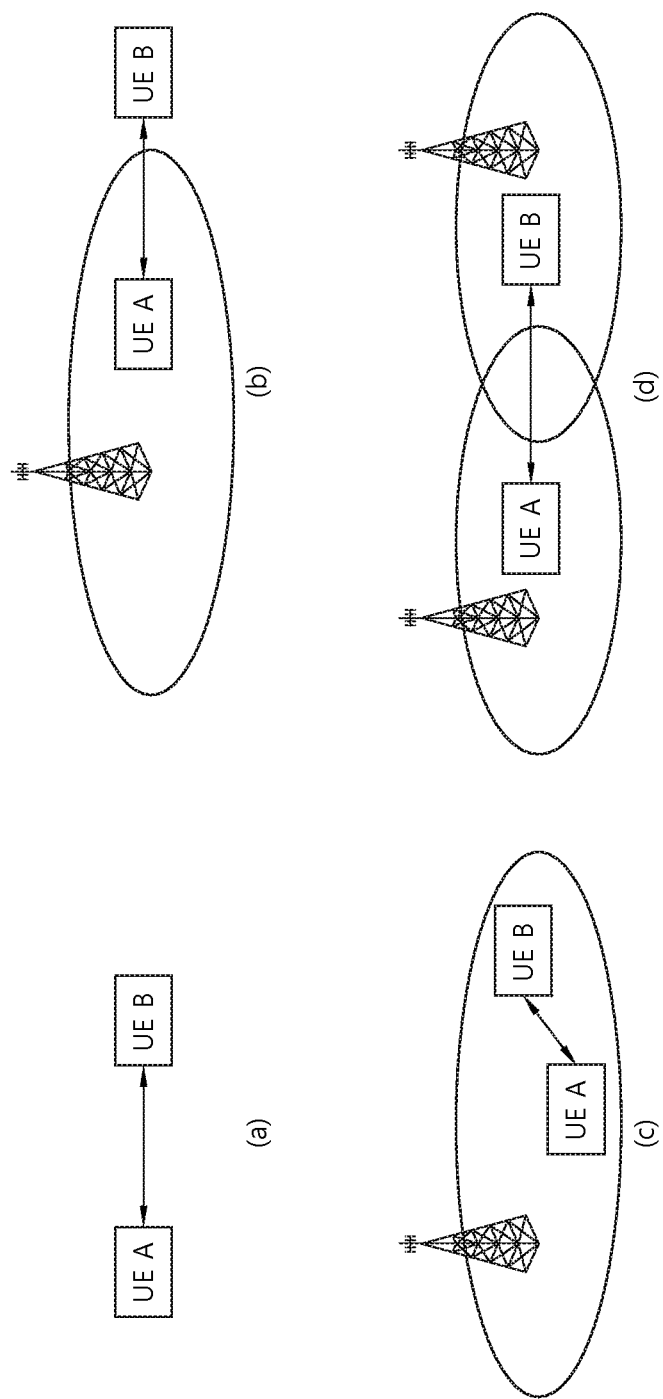
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
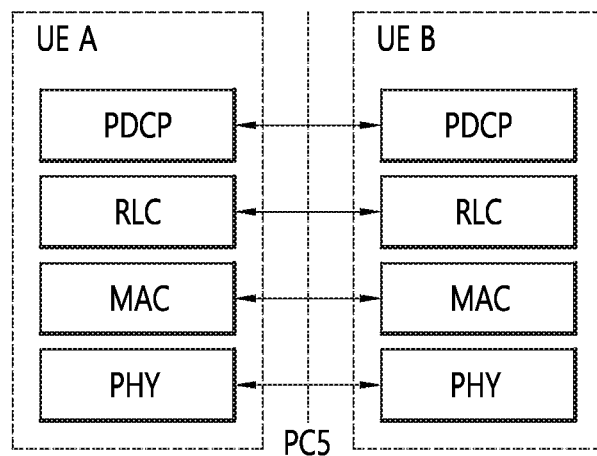
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
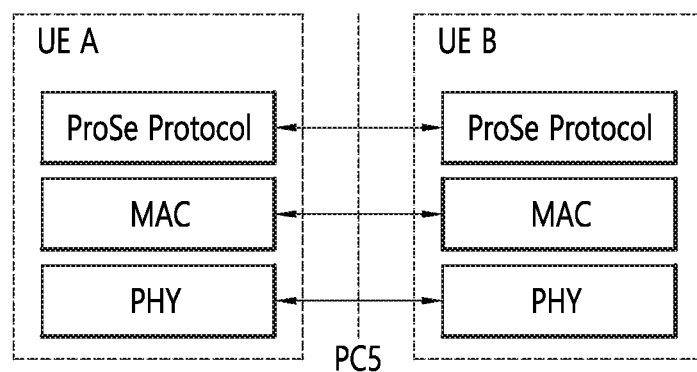
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
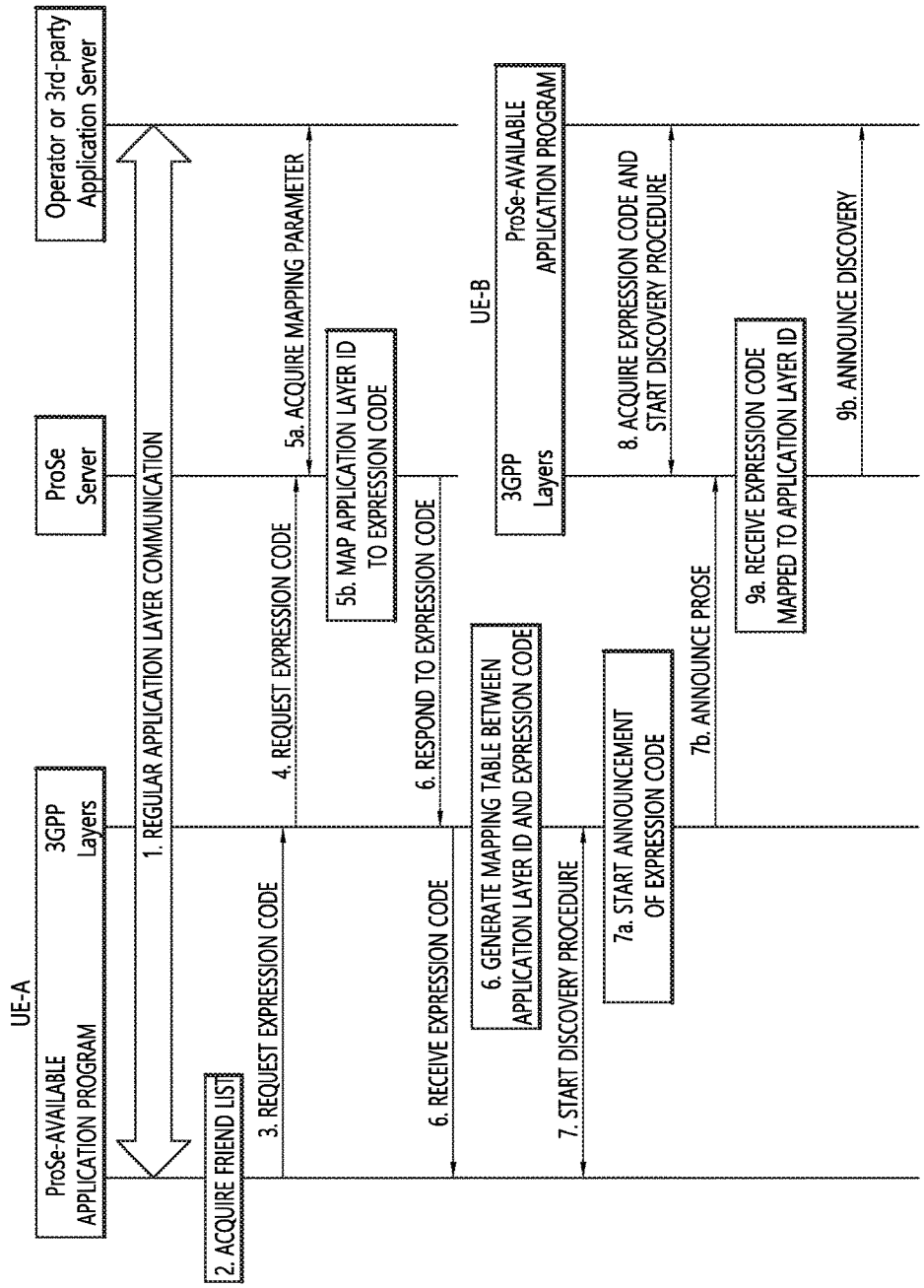
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
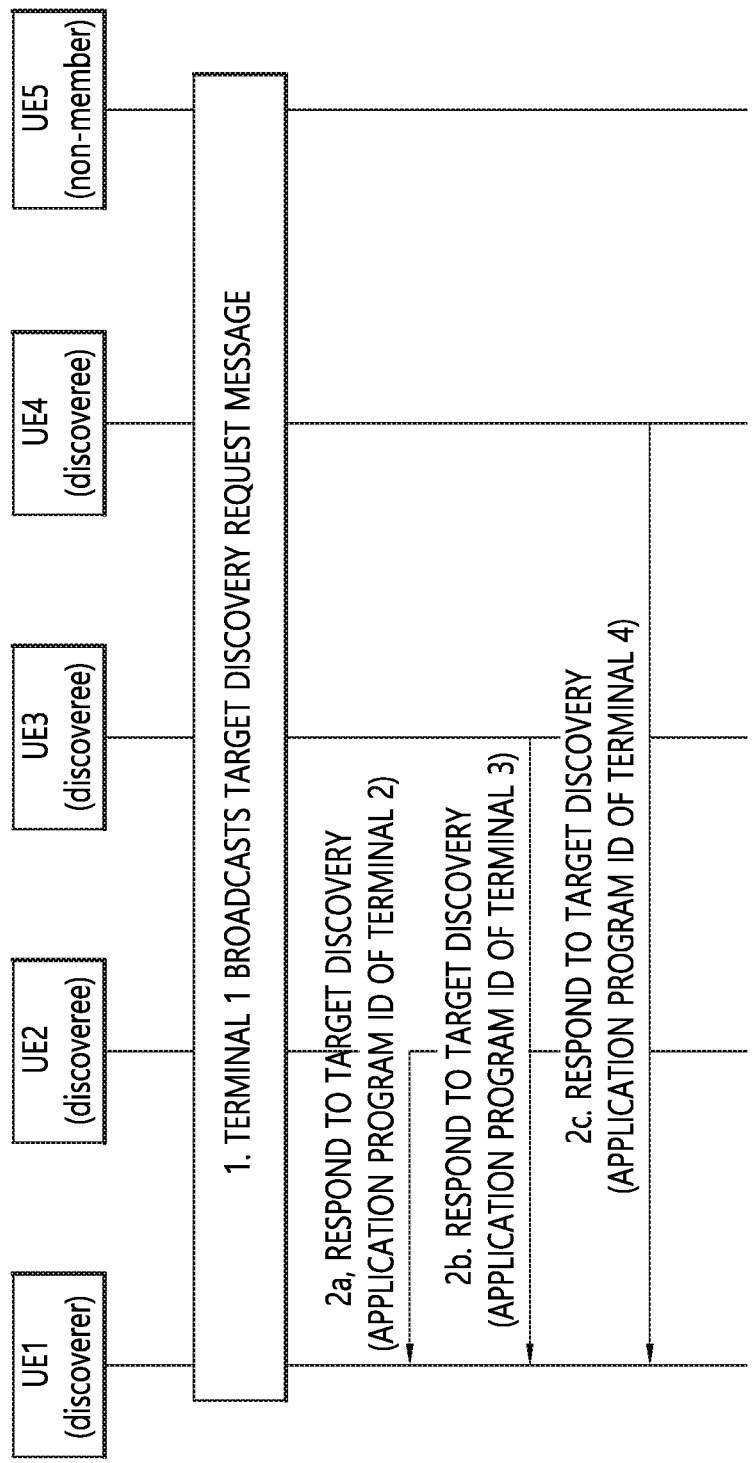
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Prior to the description of the present invention, D2D operation in UE according to the prior art will be described.

A UE operating in frequency division duplex (FDD) may use an FDD carrier. The FDD carrier includes a DL (downlink) carrier used in a downlink from an eNB (network) to the UE and a UL (uplink) carrier used in an uplink from the UE to the eNB, and the DL carrier and the UL carrier have different frequencies. The UE may receive a downlink signal by a general cellular communication through the DL carrier and a signal according to a D2D operation (e.g., a D2D discovery signal transmitted by another UE) through the UL carrier.

The D2D discovery resource pool may be configured by the network, when the UE is able to receive the D2D discovery signal from the D2D discovery resource pool. The D2D discovery resource pool may be informed via a signal broadcasted by the network or a UE-specific signal for a particular UE. When the UE has only one receiving unit, while the UE is receiving the D2D discovery signal in the subframes (of the UL carrier) belonging to the D2D discovery resource pool, it is not expected to read the DL signal in the DL carrier connected to the UL carrier. More specifically, it is not expected to read a downlink signal in a subframe immediately prior to and subsequent to the subframes belonging to the D2D discovery resource pool capable of receiving the D2D discovery signal. The UE in the RRC connection state may receive the RRC signal including one bit indicating whether the operation is applied or not. A measurement gap in cellular communication is excluded from the operation. A reception of a paging signal has a higher priority than a reception of the D2D signal. In the TDD carrier, the downlink signal may be read according to the conventional operation on a carrier that is configured to monitor the D2D signal.

However, the UE may desire to use only a part of the D2D resources (e.g., the D2D discovery resource pool) configured by the network (It may be expressed that the UE is only interest in a partial resources). In the above example, if there is a UE that is interested in receiving the D2D discovery signal only in partial subframes among the subframes belonging to the D2D discovery resource pool, it is effective to further restrict the D2D discovery resource pool for the UE. This is because the downlink signal reception restriction by the cellular communication may be limited to the above-mentioned partial resources (partial subframes) in the entire D2D discovery resource pool.

Figure 15:
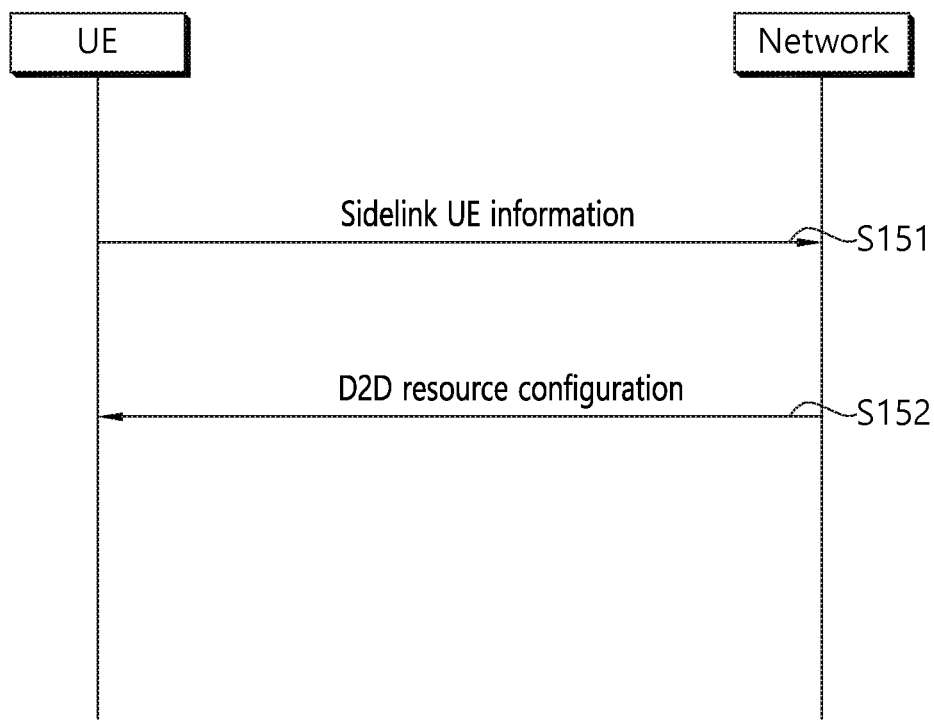
FIG. 15 illustrates a D2D operation method of a UE according to an embodiment of the present invention.

FIG. 15 illustrates a D2D operation method of a UE according to an embodiment of the present invention.

Referring to FIG. 15, the UE transmits sidelink UE information to the network (S151). The Sidelink UE information may inform the network whether the UE is interested in receiving the D2D communication or the D2D discovery signal. Further, the Sidelink UE information may request allocation/release of D2D resources for transmission of D2D communication or D2D discovery signal.

Further, the Sidelink UE information may inform the network of the D2D resource that the UE desires to use in receiving the D2D signal. For example, the Sidelink UE information may be informed to the network of the D2D discovery resource in which the UE is interested using for receiving the D2D discovery signal.

For example, let's suppose that the network has informed via SIB 19 to the UE of a D2D discovery resource pool that may be used to receive a D2D discovery signal.

The following table illustrates an example of the SIB 19.

D2D discovery transmission resource pool in which the UE is allowed to transmit the D2D discovery signal in the RRC idle state.

The UE may desire to use only a part of the D2D discovery reception resource pool, not the entire D2D discovery receiving resource pool, to receive the D2D discovery signal. In this case, the UE may inform the network of the resource having some interest through the Sidelink UE information.

Let's suppose there are multiple pools of resources that may be used to receive D2D signals, there is an index that may identify each pool of resources, and the index is associated with a particular use. For example, the index may represent a particular service type, such as a common safety/commercial service, or may represent a discovery signal range. In this case, the UE may transmit indices indicating the use of interest to be included in the Sidelink UE information.

That is, the UE may transmit an index capable of identifying some resources that are interested in the D2D operation to be included in the sidelink UE information.

The network provides D2D resource configuration to the UE (S152). The D2D resource configuration may inform the D2D resource determined based on the Sidelink UE information. The D2D resource may be a subset of the D2D discovery reception resource pool.

The UE with only one receiving unit may be in general cellular communication with the network at frequency f1, while it may have to receive the D2D signal at frequency f2. While the UE is monitoring the D2D signal at frequency f2, the UE may not perform downlink signal monitoring/measurement in cellular communication at f1. In this respect, the resource in which the UE should monitor the D2D signal at frequency f2 is similar to the measurement gap in cellular communication. Hereinafter, a resource that is required to monitor a D2D signal (e.g., a D2D discovery signal) may be

TABLE 2

```
-- ASN1START
SystemInformationBlockType19-r12 ::= SEQUENCE {
    discConfig-r12              SEQUENCE {
        discRxPool-r12                                      SL-DiscRxPoolList-r12,
        discTxPoolCommon-r12        SL-DiscTxPoolList-r12
            OPTIONAL, -- Need OR
        discTxPower Info-r12        SL-DiscTxPowerInfoList-r12   OPTIONAL,    -- Cond Tx
        discSyncConfig-r12          SL-SyncConfigList-r12        OPTIONAL     -- Need OR
    }
                                    OPTIONAL,                    -- Need OR
    discInterFreqList-r12           SL-CarrierFreqInfoList-r12   OPTIONAL,    -- Need OR
    lateNonCriticalExtension        OCTET STRING                 OPTIONAL,
    ...
}
SL-CarrierFreqInfoList-r12 ::=    SEQUENCE (SIZE (1..maxFreq)) OF SL-CarrierFreqInfo-r12
SL-CarrierFreqInfo-12::=          SEQUENCE {
    carrierFreq-r12                   ARFCN-ValueEUTRA-r9,
    plmn-IdentityList-r12             PLMN-IdentityList4-r12     OPTIONAL     -- Need OP
}
PLMN-IdentityList4-r12 ::=  SEQUENCE (SIZE (1..maxPLMN-r11)) OF PLMN-IdentityInfo2-r12
PLMN-IdentityInfo2-r12 ::=        CHOICE   {
    plmn-Index-r12                    INTEGER (1..maxPLMN-r11),
    plmnIdentity-r12                  PLMN-Identity
}
-- ASN1STOP
```

In the above table, 'discRxPool' indicates the resources allowed to receive the D2D discovery signal in the RRC idle state and the RRC connected state, i.e., the D2D discovery reception resource pool. 'DiscTxPoolCommon' indicates a referred to as a sidelink gap or simply a gap. In the subframe corresponding to the side link gap, the UE monitors the D2D signal and may not monitor/measure the downlink signal in general cellular communication.

Figure 16:
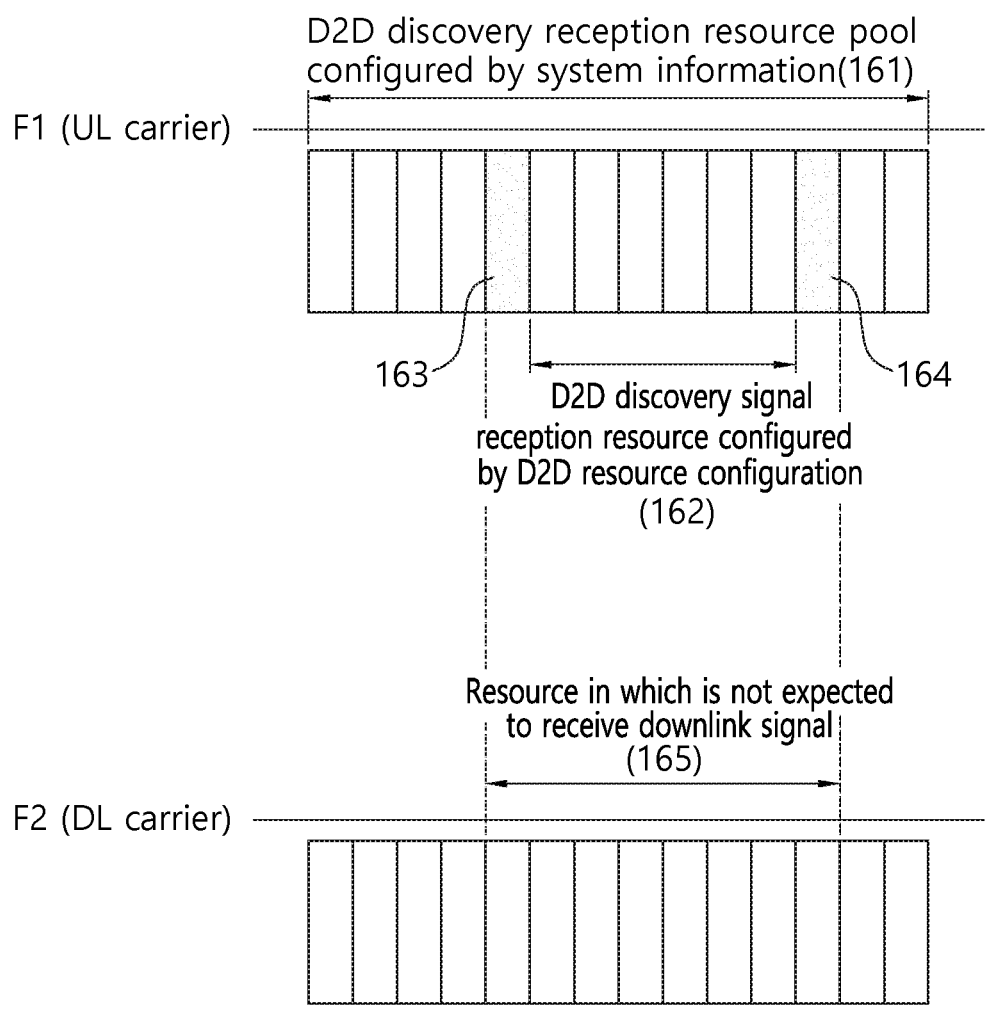
FIG. 16 illustrates a method of operation when a UE having only one receiving unit receives a D2D signal in the FDD.

FIG. 16 illustrates a method of operation when a UE having only one receiving unit receives a D2D signal in the FDD.

Referring to FIG. 16, F1 is an uplink (UL) carrier frequency and F2 is a downlink (DL) carrier frequency. F1 and F2 are FDD carriers and may be linked by SIB to form one cell.

The UE receives the downlink signal by the general cellular communication from the eNB at F2, and transmits the uplink signal from F1 to the eNB. Further, the UE may be configured to receive/transmit the D2D signal, e.g., the D2D discovery signal, at F1.

The UE may configure partial resources 162 among the D2D discovery reception resource pool 161 configured through system information from the eNB by the D2D resource configuration. The partial resource 162 may be configured by the network based on the sidelink UE information transmitted by the UE.

The UE having only one receiving unit may not receive the downlink signal at F2 because it has to monitor the D2D discovery signal at F1 in the subframes belonging to the partial resources 162. Further, the downlink signal may not be received in the subframe 163 immediately prior to the subframe belonging to the partial resource 162 and the subframe 164 immediately subsequent to the subframe belonging to the partial resource 162. The subframes 163 and 164 may be used as a transient time for frequency change between F1 and F2. As a result, the UE does not expect to receive the downlink signal from the resource 165 of F2.

By the D2D resource configuration, the network (serving cell) may inform the following information.

The serving cell may inform the UE whether it is allowed to not read the downlink signal in the corresponding subframe 165 or not.

For example, the serving cell may indicate whether it is allowed to not read the downlink signal on the downlink carrier frequency connected to the uplink carrier frequency in the subframes belonging to a specific D2D discovery resource pool.

Or, the serving cell may indicate in the subframes belonging to at least one D2D discovery resource pool whether it is allowed to not read the downlink signal on the downlink carrier frequency connected to the uplink carrier frequency.

For example, the network may know resources in which the UE is interested in receiving the D2D discovery signal based on the Sidelink UE information. Based on the resources, when performing downlink scheduling for the UE, the network may not perform the downlink scheduling in the subframe corresponding to a resource in which the UE is interested in receiving the D2D.

Meanwhile, if the UE has a plurality of receiving units and may simultaneously receive signals on the downlink carrier and the uplink carrier, then it is possible to receive the D2D signal on the uplink carrier without affecting reception of the downlink signal on the downlink carrier However, even in such a case, the present invention is useful. For example, let's suppose that a downlink signal is received using receiver 1 in band A and a D2D signal is received using receiver 2 in the same band A. The eNB may allow the UE to not read the downlink signals in partial subframes using the method described in FIGS. 15 and 15. Then, in the partial subframes, the UE may use the receiver 1 for monitoring the D2D signal in the band B.

Figure 17:
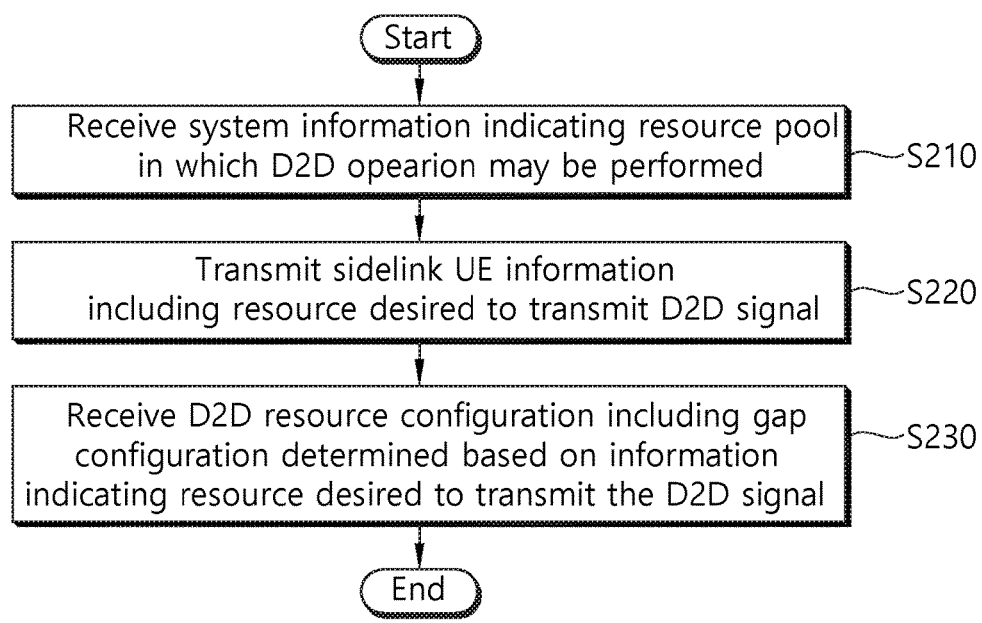
FIG. 17 illustrates an example of application to the D2D operation method of the UE.

FIG. 17 illustrates an example of application to the D2D operation method of the UE.

Referring to FIG. 17, the UE receives system information indicating a resource pool capable of performing a D2D operation (S210). D2D operation encompasses D2D signal transmission/reception, D2D communication, D2D discovery, etc. Herein, the D2D signal transmission is taken as an example.

The UE transmits sidelink UE information including information indicating a resource to which the D2D signal is to be transmitted (S220). That is, the UE itself informs the network of the resource in which is interested in the transmission of the D2D signal through the sidelink UE information. This process may be performed by requesting the UE to configure the sidelink gap to the network.

The UE receives a D2D resource configuration including a gap configuration determined based on information indicating a resource to which the D2D signal is to be transmitted (S230). The gap configuration means a configuration for the sidelink gap described above. That is, the network configures the sidelink gap to the UE. The sidelink gap may have one pattern or a plurality of patterns. After configuring the sidelink gap, the network may dynamically activate or deactivate (via a physical layer signal or the MAC layer signal) for each pattern configuring the sidelink gap. The network may activate/deactivate all or only specific patterns that configure the sidelink gap.

The subframe used for monitoring or transmission of the D2D discovery signal is referred to as a discovery subframe. The UE in the RRC connection state may be allowed to generate a sort of gap to transmit/receive the D2D discovery signal in the discovery subframe. It may be referred to as a sidelink gap (hereinafter, abbreviated as gap) as described above. The network may control whether the UE is allowed to generate the gap.

Using the gap for transmission/reception of the D2D discovery signal may be limited to prevent excessive performance degradation of signal reception by cellular communications.

When introducing a gap for transmission/reception of a D2D discovery signal, the network may control whether or not to allow the generation of a gap via a UE-specific dedicated signal. A network operator may allow the gap generation if it intends to increase the D2D discovery capability of the UE and otherwise may not allow the gap generation.

The network may allow the UE in RRC connection via a dedicated signal to generate a gap to be able to receive the D2D discovery signal on the primary carrier. As described above, the network may control whether a gap is generated or not. That is, the network may not allow or allow generation of a gap to a specific UE.

Meanwhile, there may be a plurality of transmission/reception resource pools of the D2D signal signaled by the network (serving cell), and each of the resource pools may not completely overlap with each other. That is, each resource pool may be overlapped for partial resource pools with other resource pools or not be overlapped at all.

If it is allowed to generate a gap in any subframe belonging to each resource pool, too many gaps may be generated. As a result, performance degradation may be occurred, which may not be neglected in the downlink signal reception of the cellular communication. In order to prevent such performance degradation, it is necessary that certain restrictions be imposed on the generation of the gap.

For example, the UE may be allowed to generate gaps only in equal to or less than a certain number of the reception resource pools. For example, when there are five receiving resource pools, it may be allowed to create a gap in the corresponding subframes only in two reception resource pools. A similar method may be applied to the transmission resource pool.

The network may inform the UE of which resource pool in which the UE may generate the gap. The UE may receive instructions from the network and generate the gap only in the discovery subframe belonging to the indicated resource pool. Therefore, this method basically controls the gap by its resource pool. For this method, the UE may indicate the required resource pool to the network.

The network may configure to the UE, the transmission/reception resource pool capable of generating the gap for D2D signal transmission/reception. That is, the network is to configure only the transmission/reception resource pool capable of generating the gap for D2D signal transmission/reception to a specific UE.

The UE may inform the network of the pool of resources required to monitor the D2D signal or the pool of resources required to transmit the D2D signal through the Sidelink UE information. As for changing the preferred resource pool for monitoring or transmission, the UE may update the existing preferred resource pool by transmitting the sidelink UE information again.

Meanwhile, if the network does not specify a particular resource pool but may only configure whether or not to allow the gap to be configured, the UE may determine that the gap may be generated only in the reception resource pool informed to the network through the latest sidelink UE information. That is, the UE may generate the gap only in the subframes belonging to the reception resource pool that the UE has previously informed to the network through the sidelink UE information.

Transmitting the sidelink UE information (e.g., D2D gap configuration request information) including the resource information necessary for the monitoring of D2D signal or the transmission of D2D signal to the network, may be limited as the case where it is determined that the D2D transmission or the D2D reception desired by the UE is not available without the D2D gap. For example, as for the UE equipped with two independent RF transmitting and receiving units and capable of performing D2D transmission and reception operations at a non-serving frequency independently of an uplink/downlink operation at a serving frequency, the D2D gap configuration request is not performed for the D2D transmission/reception operation, which is available without the D2D gap configuration in the eNB.

Or, the network may configure an upper limit value that limits the maximum amount of gaps that the UE may generate. If the UE configures the gap only in the number of subframes smaller than the upper limit value, it may be considered that gap generation is allowed, up to the upper limit value within a time interval configured by the network.

For example, let's suppose that the threshold value indicating the maximum number of subframes of the gap that may be generated by the UE and configured by the network is threshold1 and the specific time interval is threshold2. The UE may consider that the generation of the gap as being allowed until the subframe with its number of threshold 1 is used as the gap within the time interval composed of the subframes with its number of threshold2.

With this method, the network may precisely control the generation of the gap. This is a gap control method for each UE. This method not only may be simple, but also may provide a sufficiently sophisticated control method in many cases. However, the eNB may not know exactly when the UE will generate the gap. Thus, this method may require the addition of discovered reception resources.

The UE may configure the gap only in a limited number of reception resource pools and in this case, an upper limit value for limiting the maximum amount of gaps in each reception resource pool may be configured. The UE may then configure the gap for each of the subframes to the upper limit value from each of the limited number of the reception resource pools. That is, the UE may generate the gap in subframes belonging to a limited number of reception resource pools configured by the network. In this case, in each of the limited number of reception resource pools, if the subframe less than the maximum number configured by the network are used as the gap, then it may be considered that the gap configuration is still allowed.

Alternatively, the network may configure whether the gap may be configured or not for reception of the discovery signal and the maximum value that limits the maximum amount of gap that may be generated by the UE.

The following table illustrates a dedicated configuration for a particular UE for the D2D discovery.

TABLE 3

```
-- ASN1START
ProseDiscConfig-12 ::=                      SEQUENCE {
    discTxResources-r12                     CHOICE {
        release                             NULL,
        setup                               CHOICE {
                        -- FFS whether dedicated signalling is needed for ProseDiscGeneralConfig
            scheduled-r12                   SEQUENCE {
                discTxResourceReference-r12     ProseDiscResourcePool-r12       OPTIONAL,
-- Need ON
                discSF-Index-r12            INTEGER (1.. Nt-1 )     OPTIONAL, -- Need ON
                discPRB-Index-r12           INTEGER (1.. Nf-1)      OPTIONAL, -- Need ON
                discHoppingConfig-r12       Prose-HoppingConfigDisc-r12  OPTIONAL   -- Need OR
            },
            ue-Selected-r12                                         SEQUENCE {
                discTxPoolDedicated-r12     ProseDiscPoolList4-12   OPTIONAL,     -- Need ON
                -- eNote: introduce delta signalling i.e. option to add/ rel an pool entries
                discTxPowerInfoDedicated-r12  ProseDiscTxPowerInfoList-r12  OPTIONAL-Need OR
                            -- FFS whether dedicated signalling is needed for discTxPowerInfoDedicated
                }
            }
        }
                                            OPTIONAL,     -- Need ON
    discRxResources-r12                     SEQUENCE {
        gapForDiscRx-r12                                            ENUMERATED {setup}
OPTIONAL,          --Need OR
```

TABLE 3-continued

```
    gapForDiscRxParameters-r12            SEQUENCE {
    gapForDiscRxSubframes-r12             ENUMRATED {n2, n5, n10, n15,
                                                     n20, n30, spare2, spare1},
    gapForDiscRxValidity-r12              ENUMERATED {sf200, sf500, sf1000, sf2000,
spare4, spare3, spare2, spare1}
}                               OPTIONAL,  -- Need OR
...
}
-- ASN1STOP
```

In the above table, 'gapForDiscRx' indicates the reception gap configuration that receiving the downlink signal of the cellular communication is restricted for receiving the discovery signal. 'GapForDiscRx' includes fields such as 'gapForDiscRxParameters', 'gapForDiscRxSubframes', and 'gapForDiscRxValidity'. 'GapForDiscRxSubframes' may indicate the subframes used in the gap configuration and may indicate the maximum amount of subframes that the UE may generate in the gap. 'GapForDiscRxSubframes' may be provided in bitmap form. 'GapForDiscRxValidity' may indicate whether the gap generation is allowed or not.

In a similar form to the above table, the transmission gap in which the downlink signal reception of cellular communication is restricted for the transmission of discovery signal may be configured for the UE.

The network may configure the reception gap and the transmission gap separately for the UE. Alternatively, the network may configure the gap, indicating whether the gap is intended for reception or for transmission, or for both the transmission and the reception. If the gap is configured without an indication of the purposes of the gap, the UE may consider the gap as for both the transmission and the reception.

The UE may inform the eNB of the resource pool to be used for receiving the D2D discovery signal. That is, the UE may inform the network of the reception resource pool in which it is interesting in receiving the D2D discovery signal. The UE may inform at least one eNB of the reception resource pool to use for reception of the D2D discovery signal. The reception resource pool may be a subset of the D2D reception resource pool configured by the system information broadcasted by the network. The UE may inform the reception resource pool together, when a resource request is transmitted for monitoring the D2D discovery signal or transmitting the D2D discovery signal FIG. 18 is another example of application to the D2D operation method of the UE.

Figure 18:
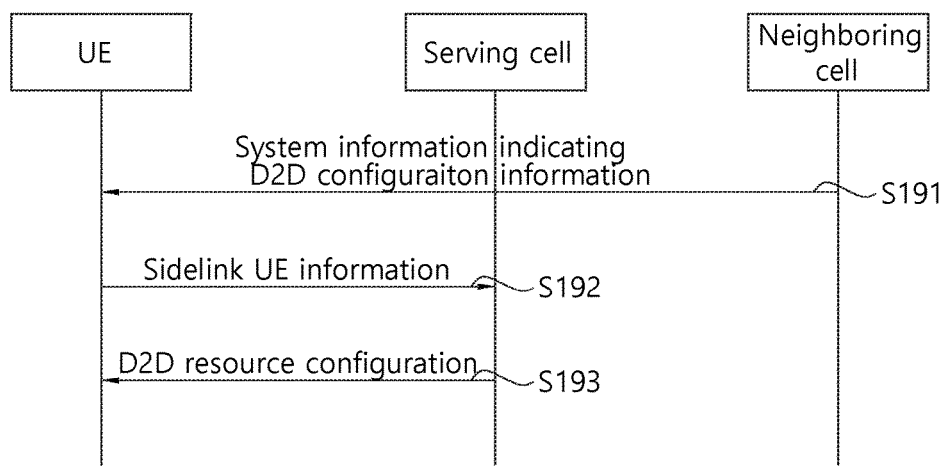
FIG. 18 is another example of application to the D2D operation method of the UE.

Referring to FIG. 18, the UE receives system information indicating D2D configuration information from a neighbor cell (S191). The D2D configuration information includes D2D resource information (e.g., time/frequency resource information) and/or synchronization information.

The UE transmits the sidelink UE information to the serving cell (S192). When the UE may report the D2D configuration information of the neighboring cell to the serving cell, it may report the entire D2D configuration information of the neighboring cell or only some of the D2D configuration information of the neighboring cell. In order to more specifically control the information included in the sidelink UE information, the network may configure the UE to report the entire neighboring cell D2D configuration information, or may configure the UE to report specific information (e.g., transmission pool configuration information or reception pool configuration information), among the neighboring cell D2D configuration information or to configure the UE to report resources and the configuration information necessary for the D2D operation. As an example, the resource information which is required for (interested in) the D2D transmission or the D2D reception by the UE among the D2D configuration information (e.g., D2D resource) of the neighboring cell, may be informed to the serving cell through the sidelink UE information.

As another example, the UE may indicate the resource pool it intends to use by applying the D2D gap. In order to indicate the cell of interest for D2D operation to the serving cell, the UE may report a frequency of the corresponding resource pool to be operated and an identifier of the resource pool that identifies the corresponding resource pool to be included in the sidelink UE information. The UE may indicate the order in which the resource pool is transmitted from the serving cell as the identifier of the resource pool. For example, if the resource pool desired to be used by the UE is transmitted in the third order in the resource pool list for transmission, the UE may indicate the resource pool desired to be used by the UE through information indicating the third order in the resource pool list for transmission. Alternatively, if the resource pool desired to be used by the UE is the resource pool transmitted in the fourth order in the pool list for reception, the UE may indicate the resource pool desired to be used by itself through information indicating the fourth order in the pool list for reception.

The network may configure to the UE, an indicator/or information indicating that transmission of the sidelink UE information message (e.g., D2D gap establishment request message) including the D2D configuration information is permitted. The indicator/information may be included in the system information or the UE specific configuration. The UE may request the D2D gap configuration to the network only when it is determined that the D2D reception desired by the UE is not available without the D2D gap.

The network may instruct the UE to report the D2D configuration information for a particular cell. To this end, the network may request the UE to report the D2D configuration information while indicating the frequency and cell identifier information. The request message may include a timer value. The UE having received the request message starts a timer with the timer value included in the request message and if the D2D configuration information is acquired from a neighbor cell indicated by the received information while the timer is operating, then the UE reports the D2D configuration to the serving cell.

The serving cell provides the D2D resource configuration to the UE (S193). The serving cell may know, through the sidelink UE information, partial resources which the UE is interested in among the D2D resources configured by the neighboring cell. The serving cell may have the UE perform the D2D operation even if the limited D2D resource is configured to the UE. That is, the serving cell may configure the sidelink gap to the UE using only the minimum resources based on the sidelink UE information.

Figure 19:
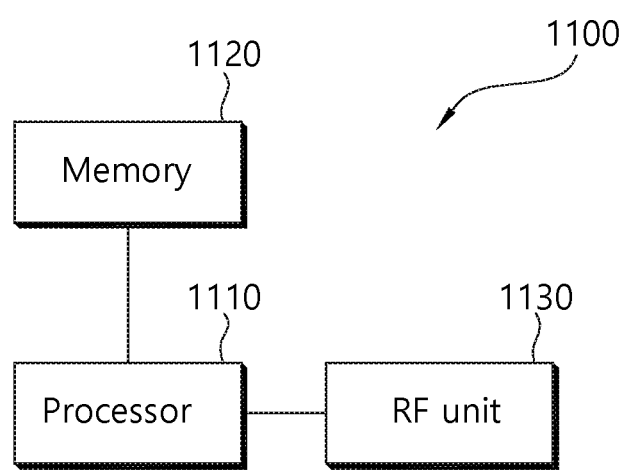
FIG. 19 is a block diagram showing a UE in which an embodiment of the present invention is implemented.

FIG. 19 is a block diagram showing a UE in which an embodiment of the present invention is implemented.

Referring to FIG. 19, a UE 1100 includes a processor 1110, a memory 1120, and a radio frequency unit (RF) unit 1130. Processor 1110 implements the proposed functionality, process and/or method. For example, the processor 1110 transmits the sidelink UE information to the network, and receives the D2D resource configuration determined based on the sidelink UE information. The sidelink UE information includes at least one of information whether the UE is interested in receiving a D2D signal and a resource allocation request for a transmission of the D2D signal.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method of device-to-device (D2D) operation in a wireless communication system, the method performed by a user equipment (UE) and comprising:
   transmitting sidelink UE information to a network;
   receiving a D2D resource configuration including sidelink gap information based on the sidelink UE information,
   wherein the sidelink UE information includes interest information, a resource allocation request for a transmission of a D2D signal, and a sidelink gap request,
   wherein the interest information informs the network that the UE is interested in receiving the D2D signal, and
   wherein the sidelink gap information informs the UE of a sidelink gap, and
   receiving the D2D signal, without monitoring a downlink signal, within the sidelink go.

2. The method of claim 1 further comprising:
   receiving system information informing the UE of a resource pool capable of performing the D2D operation from the network.

3. The method of claim 2, wherein the system information further informs the UE of the resource pool in which the UE is capable of receiving a discovery signal.

4. The method of claim 1,
   wherein the sidelink information further includes interested resource information, and
   wherein the interested resource information informs the network of resources in which the UE is interested in receiving the D2D signal.

5. The method of claim 4, wherein the resources in which the UE is interested in receiving the D2D signal is a subset of a resource pool capable of performing the D2D operation based on system information received from the network.

6. The method of claim 1, wherein the gap information is a bitmap for subframes which are capable of receiving the D2D signal.

7. A user equipment (UE) comprising:
   a transmitter and receiver; and
   a processor operatively coupled to the transmitter and receiver, and
   wherein the processor is configured to:
   control the transmitter to transmit sidelink UE information to a network;
   control the receiver to receive a D2D resource configuration including sidelink gap information based on the sidelink UE information,
   wherein the sidelink UE information includes interest information, a resource allocation request for a transmission of a D2D signal, and a sidelink gap request,
   wherein the interest information informs the network that the UE is interested in receiving the D2D signal, and
   wherein the sidelink gap information informs the UE of a sidelink gap, and
   receiving the D2D signal, without monitoring a downlink signal, within the sidelink gap.

* * * * *